Jan. 26, 1926.

F. L. VAN ALLEN 1,570,800

APPARATUS FOR DESEEDING FLAX

Filed August 2, 1921  6 Sheets-Sheet 3

INVENTOR
FREDERIC L. VAN ALLEN.

BY
ATTYS.

Jan. 26, 1926.

F. L. VAN ALLEN

1,570,800

APPARATUS FOR DESEEDING FLAX

Filed August 2, 1921   6 Sheets-Sheet 4

Patented Jan. 26, 1926.

1,570,800

UNITED STATES PATENT OFFICE.

FREDERIC LANGTRY van ALLEN, OF GODERICH, ONTARIO, CANADA.

APPARATUS FOR DESEEDING FLAX.

Application filed August 2, 1921. Serial No. 489,386.

*To all whom it may concern:*

Be it known that I, FREDERIC LANGTRY VAN ALLEN, a subject of the King of Great Britain, residing at the city of Goderich, in the Province of Ontario, formerly residing at the city of Regina, in the Province of Saskatchewan and Dominion of Canada, have invented certain new and useful Improvements in Apparatus for Deseeding Flax, of which the following is a specification.

This invention relates to improvements in apparatus for deseeding flax.

The flax plant containing two useful commodities, linseed and textile fibres, and its cultivation, is specialized for one of these commodities to the detriment and sometimes to the complete destruction of the other.

Where specialization for linseed takes place, large acreages of flax are cultivated. Harvesting the crop rapidly becomes a matter of vital importance. It is not bound into sheaves but raked or forked as hay, consequently the heads with the seed balls and the butt of the stalks are inextricably mixed and tangled together. The deseeding is accomplished by machines that are designed and constructed for threshing the standard cereals such as wheat or oats. This manner of threshing the flax, while rapid, results in breaking the flax stalk and consequently the fibre that it contains, into such short lengths as to render it unfit for commercial purposes.

When specialization for textile fibre takes place, smaller acreages of flax are cultivated. The harvesting of this crop is accomplished by pulling the plant from the soil by the root and binding the stalks carefully into small sheaves. The deseeding process is a very slow one as the stalks containing the fibre have to be handled carefully and in such a manner that they shall remain unbroken and continue to lay in a position parallel to each other.

The object of my invention is to rapidly by mechanical means separate the seed from the flax plant without the stalk being injured and its further use for fibre production being impaired, and that irrespective of the object for which the plant has been specially cultivated, whether for linseed or textile fibre.

Further objects of the invention are to provide simple and effective means for feeding the flax plants to the deseeding means and holding them evenly in position during the operation. Further objects still are to provide a suitable beating means for operating on the flax plants after they have passed the deseeding roller to free them from the seed and to collect the same.

More specific objects of the invention are to provide improved means for exerting a spring pressure on the deseeding rollers. Further objects still are to provide improved conveying means which will hold the plants firmly notwithstanding variation in thickness thereof.

In its construction, the invention includes the improved construction and arrangement of parts hereinafter described in detail in the accompanying specification and drawings.

In the drawings.

In the drawings, like characters of reference indicates corresponding parts in all the figures.

Referring to the drawings:

A represents a relatively large conveying roller and B, a plurality of deseeding rollers adapted to operate on the conveying roller while the flax plants are retained in position thereon by means of conveying belts C and D. The conveying roller A and supporting rollers for the conveying belts, as well as the other operative parts of the machine, are supported from a suitable frame E.

Figure 1:
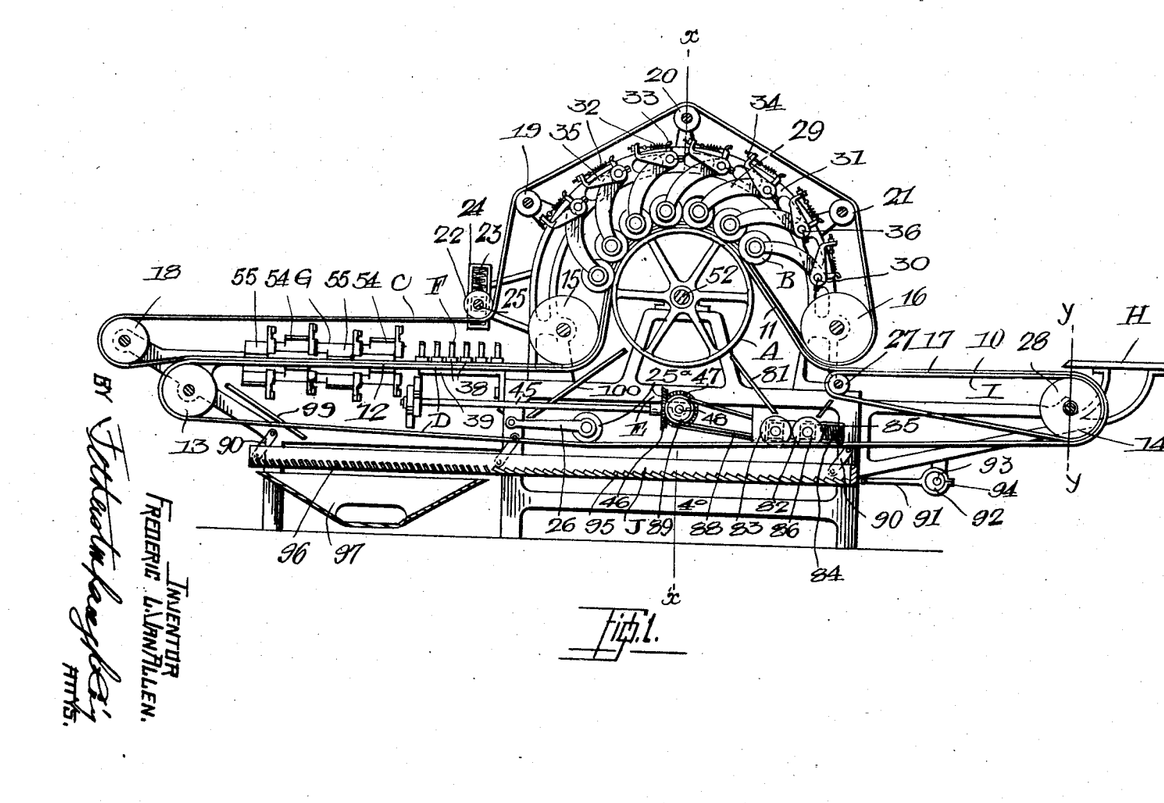
Figure 1 is a sectional elevation of an embodiment of the apparatus.
Figure 2:
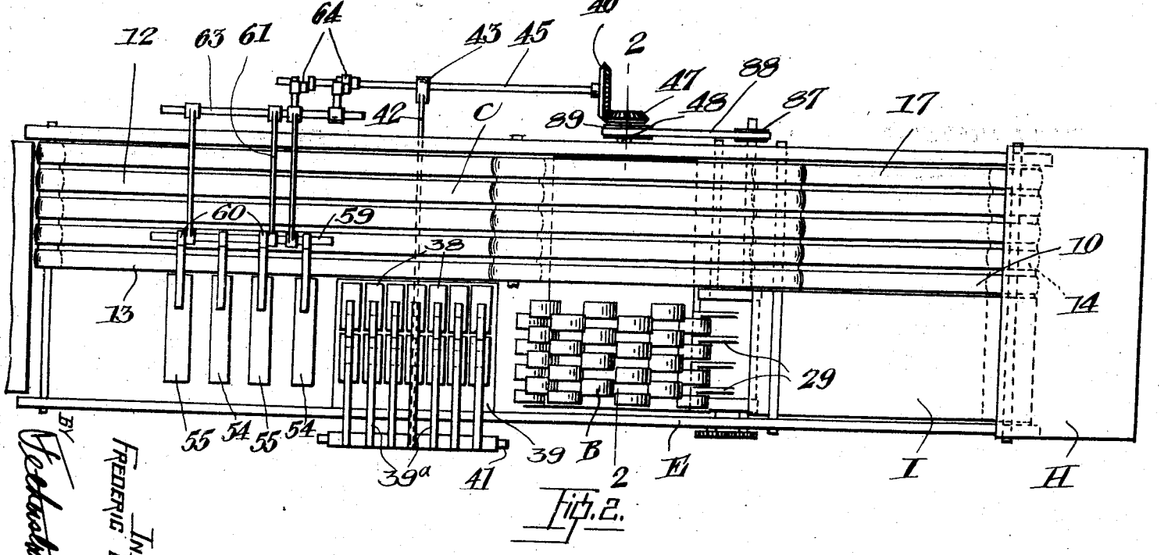
Figure 2 is a plan view.
Figures 3, 9, 10:
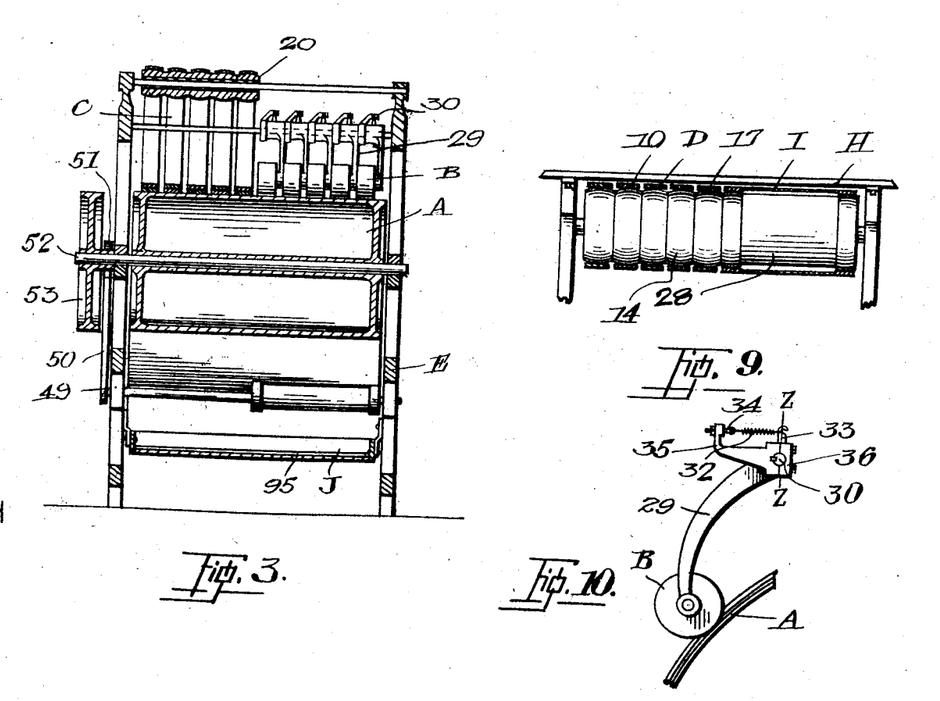
Figure 3 is a cross-sectional view taken on the line $x-x$, Figure 1.
Figure 9 is a sectional elevation of a portion of the conveying belt.
Figure 10 is a detail in elevation of the supporting means for the deseeding rollers.
Figures 4, 5, 6:
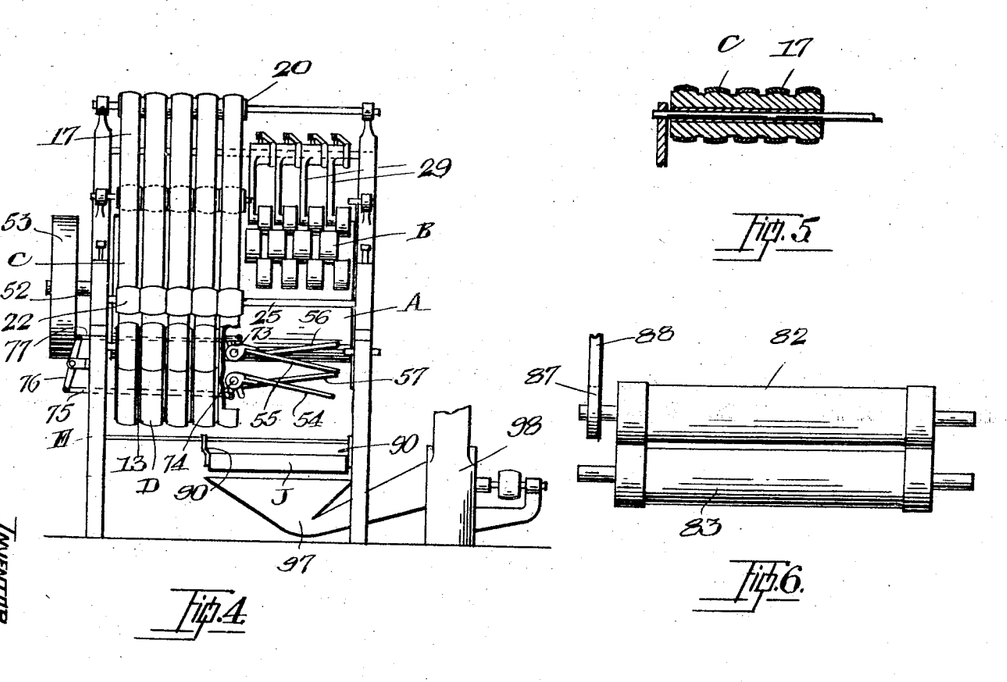
Figure 4 is an end elevation partially broken away to show the construction.
Figure 5 is a sectional detail through the rollers for the conveying belt.
Figure 6 is an enlarged plan view of the rollers utilized for threshing the balls of seed.

It will be seen that the conveying belt D is formed with a horizontally extending feeding portion 10 with an intermediate portion 11 which extends upwardly and over the conveying roller A and with a horizontally extending portion 12 which retains the flax plants while they are being operated upon by the hammers F and the beaters G. The conveyor D is supported on suitable end rollers or pulleys 13 and 14 and on intermediate rollers or pulleys 15 and 16. In accordance with the present invention, in order to enable the conveying belt to accommodate itself to the varied length of the flax plants instead of forming it in a single belt, it is formed by a plurality of independently supported and laterally adjacent belts 17, each belt being supported on independent crowned rollers all joined together to make one solid length as shown in Figure 5.

The conveying belt C extends around the pulleys or rollers 15 and 16 as well as around end rollers 18 located above and outwardly from the rollers 13 and upper rollers 19, 20, and 21 above the drum A. The conveyor C contacts with the conveyor D from the end of the portion 10 around the portion 11 and through the portion 12, projecting somewhat over the end of the conveyor D to enable the flax plants to drop from between the conveyors downwardly. It will be understood that all of the supporting rollers 13, 14, 15, 16, 18, 19, 20 and 21 are formed by a plurality of laterally adjacent crowned rollers fastened together which support laterally adjacent but independent conveying belts which will thus accommodate themselves to the difference in length of the flax plants, the belts being arranged in upper and lower pairs.

Suitable belt tightening means are provided for the conveyors; the means I have shown comprising a roller 22 bearing against the conveyor C with spring pressure exerted by a spring 23 extending from a bracket 24 through the shaft 25 supporting the roller. The tension on the conveyor belt D is produced by a weighted roller 25$^a$ supported on a pivoted arm 26 pivoted to its frame, the roller resting by gravity on the upper surface of the underside of the conveyor.

The flax plants are designed to be fed to the conveyor D from a feeding table H and while passing along the portion 10 of the conveyor the protruding heads of the plant are designed to be supported by an endless conveyor I having its upper surface extending on the same plane and parallel with the surface of the conveyor D whereby the heads of the flax plant will be supported by the conveyor I which latter may itself be supported on suitable rollers 27 and 28, the roller 28 being a continuation of the roller 14.

As the flax plants pass over the conveyor roller A the heads or branches bearing seed pods are operated upon by the deseeding rollers B which are arranged peripherally on the roller A and in staggered relation to each other. Each roller B is supported from a pivoted arm 29 which is loosely mounted on a cross-shaft 30 supported from brackets 31 on the frame. Spring pressure on each deseeding roller is produced by a spring 32 which extends from an arm 33 on the arm 29 to a bolt 34 which is adjustably secured to an arm 35 rigidly secured to the shaft 30. The arm 35 is formed with a split cap 36 bolted to the end and by which it is removably secured in position on the shaft being held in angular position with respect to the shaft by a suitable key. The spring tension is regulated by adjusting the bolt 34 so that the seed balls of the flax plant passing beneath the rollers will be crushed and the seeds liberated.

The flax plants, after passing under the deseeding rollers B, pass beneath the hammers F. I have shown a series of six hammers, but any convenient number may be provided to suit the character of the flax plants being worked.

Each of these hammers includes a flat head 38 which may be either in one piece or in two or more sections designed to operate against the table 39 supported from the frame and over which the heads of the flax plants are carried by the conveyors C and D, the head 38 being supported by a spring arm 39$^a$, the opposite end of which is connected to a lever 40 centrally pivoted to a shaft 41 supported from the frame and designed to be oscillated by suitable means such as a connecting rod 42 extending from a strap 43 which surrounds an eccentric 44 on the shaft 45 which is driven from any suitable source of power. I have shown the shaft 45 connected by a bevelled gear 46 with a corresponding bevelled gear 47 on a countershaft 48, which has a pulley 49 thereon connected by a belt 50 with a pulley 51 on the shaft 52 which supports the drum A, the latter shaft being conveniently driven from a suitable source of power by means of a pulley 53 thereon. It will be seen that action of the eccentric 44 will cause oscillation of the lever 40 which will raise and lower the hammer head 37 against the heads of the flax plants passing over the table 39.

After the flax plants have been thus subjected to the action of the hammers F they are operated upon by the beaters G. I have provided two sets of beaters 54 and 55 operating in opposite directions, each set comprising a pair of parallel oscillating arms. I have shown two beaters 54 and two beaters 55, but any convenient number might be provided. Each beater 54 (Figure 8) comprises a pair of parallel beater arms 56 and 57 adapted to pass above and below the flax plants respectively and supported from shafts 58 and 59 to which they are rigidly connected, the shaft 59 being oscillated by means of a crank 60 connected thereto and having its extremity connected by a link 61 with a lever 62 loosely mounted on a shaft 63, the lever 62 forming a bell crank with the lever K which in turn is operated by a connecting link 64. The link 64 is operated from a crank L which is at the extremity of the countershaft 45. It will be seen that by the crank L rotating the arms 56 and 57 of set 54 will move up and down in a parallel relative position, at the same time allowing a free passage of straw.

The beaters 55 (Figure 7) each includes parallel beater arms 70 and 71 mounted pivotally on shafts 58 and 59. Levers $A^1$ form bell cranks with 70 and 71 and are connected at their extremity through connecting rods 61 and 75 to the double lever $J^1$ which in turn is rigidly connected at its centre to the countershaft 63. The lever $I^1$ is securely fastened at one end to countershaft 63 and at the other extremity is connected to the link 64 which in turn is operated by a crank M making part of the countershaft 45. The crank M has an opposite throw to the crank L. Therefore, as the countershaft 45 rotates, the beaters 70 and 71 of set 55 will move up and down in a relative parallel position but always in an opposite direction to the set 54. The straw in passing through these beaters will be fanned out continually and thus cause any loose seed or chaff lodging among the branches to drop. In this manner the flax is delivered thoroughly freed from seed.

Figures 7, 8, 11, 12, 13:
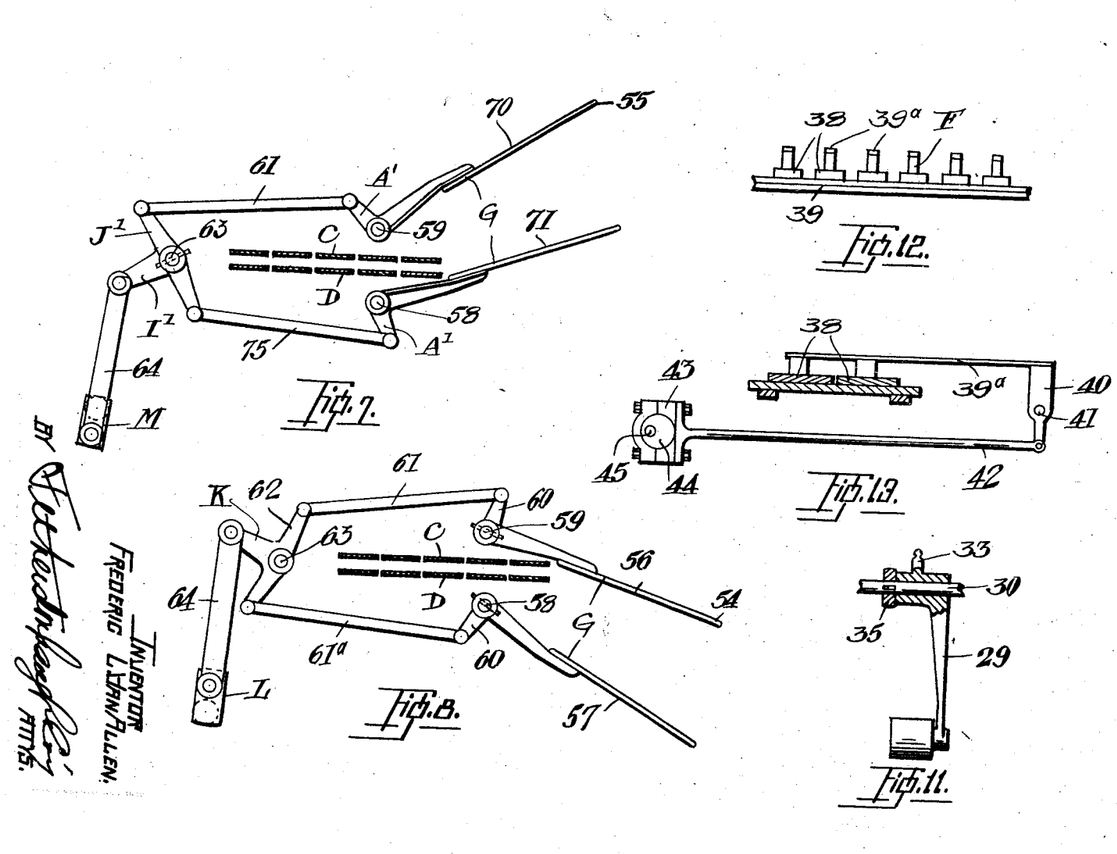
Figure 7 is a detail in elevation of the beater mechanism.
Figure 8 is a detail in elevation of another part of the beater-mechanism similar to that shown in Figure 7.
Figure 11 is a sectional detail on the line $z-z$, Figure 10.
Figure 12 is an end view of the hammer members.
Figure 13 is a sectional elevation of one of the hammer members and the operating mechanism therefor.
Figure 14:
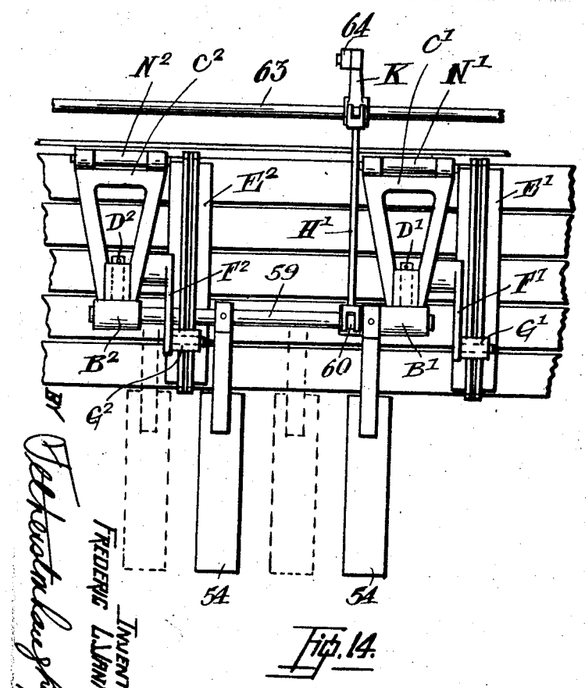
Figure 14 is a detail in plan of a portion of a hammer member, certain parts omitted as shown in dotted lines.
Figure 15:
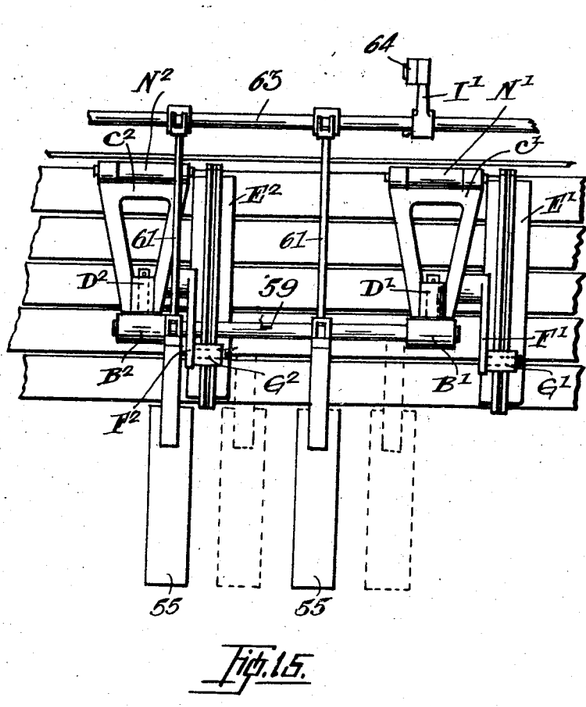
Figure 15 is a detail in plan of the hammer member showing in full lines the portions shown in dotted lines in Figure 14.

In Figures 7 and 8, the shaft 58 has fixed bearings on the frame E while the shaft 59 has floating bearings. This is indicated in Figures 14 and 15. The ends of the shaft 59 are held by bearings $B^1$ and $B^2$. These bearings pivot at $D^1$ and $D^2$ in frames $C^1$ and $C^2$, these frames in turn being hinged at N and N' to the frame E. Frames $C^1$ and $C^2$ rest on rollers $E^1$ and $E^2$ by means of arms $F^1$ and $F^2$ which hinge at $G^1$ and $G^2$. As the straw passes between the feed belts, the roller $E^1$ is first lifted as a fixed bearing roller exists immediately below it under the feed belts, then as the straw fed, reaches $E^2$, and $E^2$ also having a fixed bearing roller immediately below it under the feed belts, it also rises and like $E^1$ follows accurately the thickness of feed passing between the belts. It will be seen that as $B^1$ and $B^2$ act as universal joints, one end of the shaft 59 can be raised before the other without causing any binding. As frames $C^1$ and $C^2$ bear on rollers $E^1$ and $E^2$ and, as the shaft 59 is supported by frames $C^1$ and $C^2$, it will thus happen that as the roller $E^1$ and $E^2$ rise or fall according to the amount of straw being fed. All top beaters of sets 54 and 55 will follow that rise or fall. It will in this manner happen that a thick feed of straw will not be cut into, and injured by the beater arms 56, 57, 70 and 71; whereas a thin feed will be well looked after, the blades coming down to meet it.

Any seed balls dropping from the flax plants before passing over the conveying drum A will be deflected by a deflecting plate 81 to a pair of rollers 82 and 83 suitably journalled in a frame and being provided with flanged ends and being recessed intermediate of their length leaving their ends in frictional engagement while the distance between the recessed portions is just sufficient to enable the flax seed to pass therethrough without crushing. These rollers are held in frictional engagement with each other by suitable means such as a spring 84 extending between a bracket 85 and the bearing block 86 of one of the rollers. One of the rollers is driven by any convenient means, such as a pulley 87 which is connected by a belt 88 with a corresponding pulley 89 mounted, for instance, on counter shaft 48. The flax seeds passing between the rollers 82 and 83 pass on to a swinging deck J pivotally supported from the frame by links 90 and which is reciprocated by suitable means such as a link 91 connecting the deck with a strap 92 on an eccentric 93 formed on a suitable countershaft 94 driven by any conveneient means. The bottom of the deck is formed with ridges or riffles 95 designed to cause the seeds during oscillation of the deck to move lengthwise to a grate 96 formed in one end of the same above a hopper 97 from which the seed may be drawn by suitable means such as a suction fan 98. Any seed freed by the hammers F or beaters G will be caused to pass into the hopper 97 by a bifurcated plate 99.

In the operation of the invention, a sheaf of unthreshed flax is opened upon the table H and spread upon the travelling belts I and a portion 10 of the conveyor D. The flax is fed lying parallel with the axis of the roller 14 and at right angles to the direction of movement of the conveyors. As the lower conveyor D meets the upper conveyor C, both being of the same width and the pairs of conveying belts meeting each other, they will firmly grip the stocks but in a manner that will not damage them, the heads of the plants with the seed balls projecting from them will pass over the bare portion of the drum A and beneath the deseeding elements B which will operate on them, crushing the seed balls and liberating the seed. The chaff and seed falling from the rollers are carried to any suitable cleaner for separating the seed from the chaff. The stocks of the plants which have been freed from the seed balls are carried by the conveyors C and D and delivered parallel to each other having first been operated upon by the hammers C and beaters G which entirely free same from any remaining seed, also clears any grain or chaff from among the branches, and disentangle the stocks from each other.

When it is desired to deseed flax that has been cultivated especially for linseed, the travelling conveyors C and D are removed entirely from the machine and the rollers B continue across the full width of the drum A. The flax that has been cut but not bound and which is in a mass and tangled condition is then fed directly into the machine and passes between the rollers B and the large drum A. The sectional rollers lend themselves to the unevenness of the mass and each sectional roller will exert an independent pressure on that portion of the mass with which it is in immediate and momentary contact. The initial pressure brought to bear upon each small roller B is transmitted to the mass through which are distributed the heads of the plants bearing the seed balls. These are crushed by pressure and the seed liberated. The deseeding flax stocks are then delivered from the rollers to an inclined tabel upon which operate a series of hammers F, reaching across the full width of the machine, then on to decks or racks of any convenient and suitable form and may be then shaken and any remaining seed and chaff separated therefrom.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. Apparatus of the character described comprising flax deseeding, hammering and beating means arranged to act on the flax in the order named and conveyor means serving to support the flax in horizontal position while presenting same to the successive action of the aforesaid means.

2. The machine as claimed in claim 1 in which the mechanism for rolling the flax comprises a deseeding roller, a shaft, an arm pivotally mounted on the shaft connected to the deseeding roller, a second arm having means embracing the shaft, means for clamping the said means to the shaft, and a spring extending between the two arms.

3. In a machine of the character claimed in claim 1, deseeding means comprising a deseeding roller, a shaft, an arm pivotally mounted on the shaft carrying the deseeding roller, a second arm, a split cap on the second arm, rigidly secured to the shaft, an adjustable bolt on the second arm, a retaining finger on the first arm, and a spring between the adjustable bolt and the retaining finger.

4. Apparatus of the character described comprising flax deseeding means, means for subjecting flax to a hammering action after being operated on by the deseeding means, opposed beaters arranged to operate on opposite sides of the flax as the latter passes from the hammering means and conveyor means for supporting and successively presenting the flax to each of the aforesaid means.

5. Apparatus of the character described comprising flax deseeding, hammering and beating means arranged to act on the flax in the order named, conveyor means arranged to travel at one side of each of the aforesaid means, said conveyor means comprising upper and lower endless belts between and by which the flax is carried, whereby said flax is supported in horizontal position by the conveyor when presented to the action of the deseeding, hammering and beating means.

6. Apparatus of the character described comprising deseeding means to which the flax is first presented, a table over which the flax is carried as it passes from the deseeding means, hammers arranged above the table to act on said flax and conveyor means serving to carry the flax from the deseeding means and over said table.

7. Apparaus of the character described comprising deseeding means to which the flax is first presented, a table over which the flax is carried from the deseeding means, hammers arranged to act on the flax as it passes over said table, beaters arranged in pairs with the beaters of each pair disposed to act on opposite sides of the flax as it passes from the table, and conveying means serving to carry the flax to the deseeding means, hammers and beaters in the order named.

8. Apparatus of the character described comprising a conveyor consisting of upper and lower endless belts between which the flax is carried horizontally with the heads of the flax projecting at one side of the conveyor and deseeding, hammering and beating means arranged in line at the said side of the conveyor to act successively on the projecting heads of the flax and in the order of their naming.

9. Apparatus of the character described comprising means for subjecting deseeded flax to a hammering action, said means comprising a table over which the flax is carried, hammers arranged above the table to operate on the flax as it passes over said table and conveying means serving to carry the flax over the table and beneath the hammers.

10. Apparatus of the character described comprising means for subjecting deseeded flax to a beating operation, said means comprising a pair of opposed beaters, conveyor means for passing the flax between said beaters and means for imparting swinging movement to the beaters to cause the same to move in the same direction and in substantially parallel relation.

11. Apparatus of the character described comprising means for subjecting deseeded flax to a beating action, said means comprising a plurality of pairs of beaters with the beaters of each pair arranged in opposing relation, means for imparting swinging movement to all of said pairs including provision for causing the beaters of one pair to travel oppositely with respect to the beaters of an adjacent pair and conveyor means passing the flax to the beaters of each pair.

12. Apparatus of the character described comprising means for subjecting flax to a hammering action, said means comprising a table, conveyor means serving to pass the flax over said table, a plurality of hammer members arranged above the table to act on the flax passing over said table, spring arms carrying said hammer members, means pivotally supporting said spring arms at one end and means co-acting with said pivotal supporting means for imparting swinging movement to the spring arms to raise and lower the hammers with respect to the table.

13. Apparatus of the character described comprising a feed table, an endless belt having its receiving end positioned adjacent said table, a second endless belt arranged above the first belt to co-act therewith and extending from the discharge end of the first mentioned belt to a point remote from the receiving end of said first mentioned belt, said upper and lower belts being adapted to receive the flax between them to carry said flax in a substantially horizontal position with the heads of the flax projecting at one side of the belts, an auxiliary belt arranged at one side of the receiving end of the first mentioned belt to support the heads of the flax traveling from the feed table to a position between the first mentioned belts, and mechanisms arranged at one side of the upper and lower belts to act on the projecting heads of the flax.

In witness whereof I have hereunto set my hand.

FREDERIC LANGTRY van ALLEN.